April 25, 1961 C. L. MESSENGER ET AL 2,981,509
OARLOCK FISHING ROD HOLDER
Filed April 24, 1959
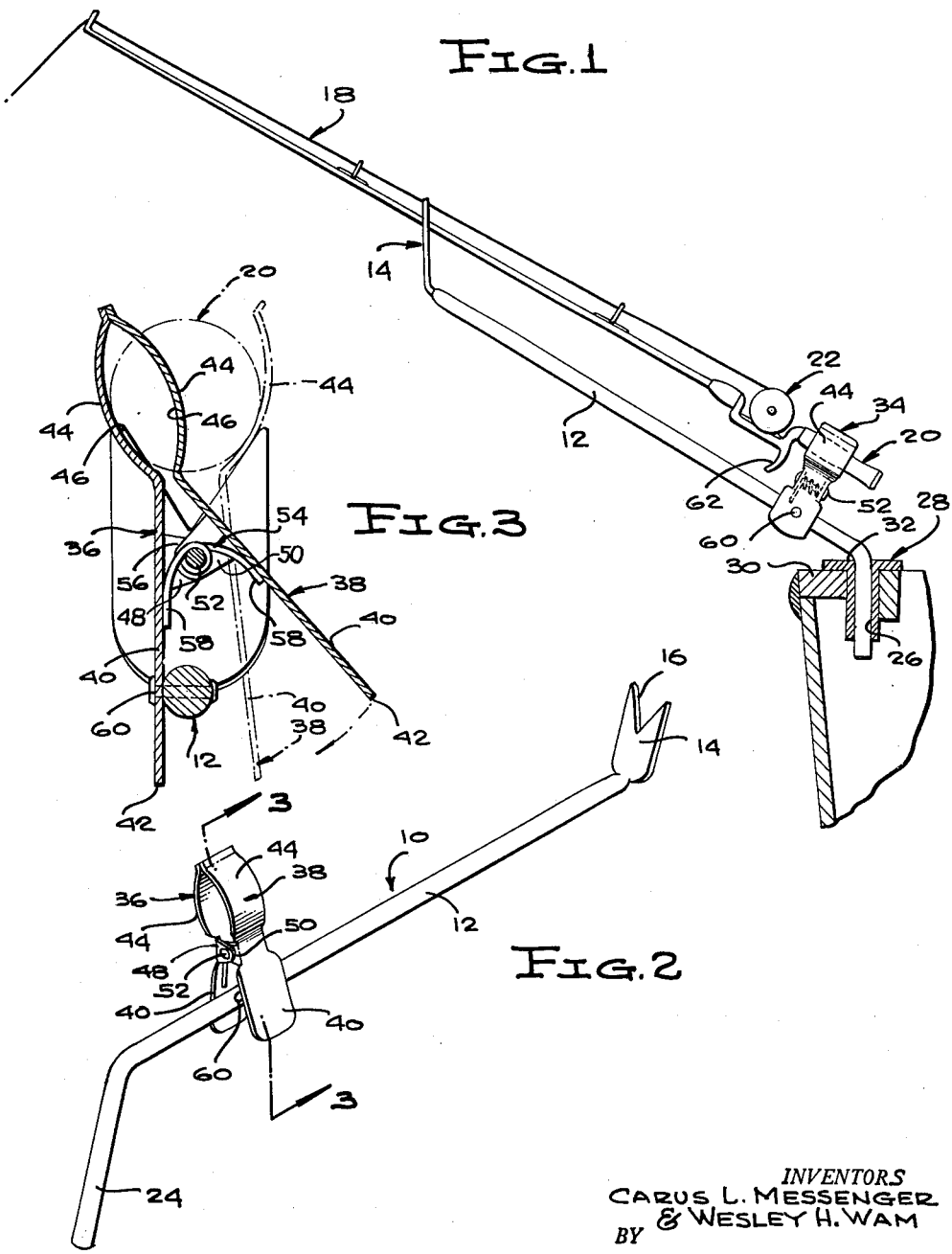
INVENTORS
CARUS L. MESSENGER
& WESLEY H. WAM
BY
McMorrow, Berman & Davidson
ATTORNEYS

United States Patent Office 2,981,509
Patented Apr. 25, 1961

2,981,509

OARLOCK FISHING ROD HOLDER

Carus L. Messenger, 927 Grant St., and Wesley H. Wam, 2073 Cottage Ave., both of Beloit, Wis.

Filed Apr. 24, 1959, Ser. No. 808,834

4 Claims. (Cl. 248—42)

This invention relates to an improved boat oarlock mounted fishing rod holder.

The primary object of the invention is to provide a simpler, more practical, and more usable device of the kind indicated, which is of uncomplicated construction, is composed of a small number of simple, readily available, and easily assembled parts, and which can be made in a rugged form at relatively low cost.

Another object of the invention is the provision of a device of the character indicated above which has a support rod which is formed at one end with a pintle to seat and turn in the bore or socket of an oarlock, is formed at its other end with a fishing rod holding fork, and has mounted at a point between the pintle and the fork a spring-pressed pivoted jaw clamp for clamping the handle of a fishing rod in place on the device.

Other important objects and advantageous features of the invention will be apparent from the following description and the accompanying drawings, wherein, for purposes of illustration only, a specific form of the invention is set forth in detail.

In the drawings:

Figure 1 is a schematic view, partly broken away and in section, showing a fishing rod held by a device of the invention supportably engaged in an oarlock;

Figure 2 is a perspective view of the device per se; and

Figure 3 is an enlarged vertical transverse section taken on the line 3—3 of Figure 2, showing the clamp jaws closed in full lines, and opened and clamping a fishing rod handle in phantom lines.

Referring in detail to the drawing, wherein like numerals designate like parts throughout the several views, the illustrated device, generally designated 10, comprises an elongated rigid rod 12, which can be a length of pipe, which is formed on its outer end with a fork, such as a flat 14 provided with a V-shaped notch 16 in its upper end, to receive an intermediate part of a fishing rod 18, having on its rear or inner end a handle 20, with a reel assembly 22 located forwardly of the handle.

The rod 12 has a vertical pintle 24 extending downwardly from its inner end, which is preferably an angularly bent portion which is a terminal of the inner end of the rod 12. The pintle 24 depends from the rod 12 preferably at an angle of about forty-five degrees, and the fork flat 14 extends upwardly from the rod at a similar angle.

The pintle 24 is adapted to be engaged downwardly in the vertical bore 26 of a boat oarlock 28 seated in or otherwise mounted on a boat gunwale 30, so that the rod 12 extends at an upward angle away from the gunwale, and can be pivoted or swung, on the axis of the pintle 24, to extend at any desired position away from the gunwale 30, while in use, or swung to extend in an out-of-the-way position along the gunwale while not in use. Where the bore of the oarlock 28 is open at both ends, as shown in Figure 2, and is not in the form of a socket having a closed lower end to support the pintle 24, the shoulder 32 defined at the meeting of the rod 12 and the pintle 24, serves as a bearing to engage the top of the oarlock and support the device for easy pivoting in the oarlock.

At a point near to and spaced from the pintle 24 a fishing rod handle embracing and support clamp 34 is mounted on the rod 12. The clamp 34 comprises a relatively stationary jaw 36 and a movable jaw 38. Both jaws are preferably of flat spring bar material and have straight arms 40 having free lower ends 42, with curved gripping elements 44 on their upper ends, which have facing concave sides 46. At locations near the elements 44 the side edges of the jaw arms 40 have thereon inwardly projecting and overlapping ears 48 and 50, through which extends a headed pivot pin 52 which serves to assemble and to pivot the jaws together. A jaw closing spring 54 comprises a coil 56 circumposed on the pin 52 and terminating in divergent and oppositely and outward tensioned arms 58. The spring arms 58 extend toward the lower ends 42 of the jaw arms 40, and can be suitably fixed at their ends to the inward sides of the jaw arms, and, in any event, bear against the inward sides of and spread the jaw arms 40 away from each other, so as to tension the gripping elements 44 toward each other.

The arm 40 of the stationary jaw 36 is pivotally mounted on the rod 12, to swing only on an axis extending crosswise of the rod 12, that is, forwardly and rearwardly, by suitable means, such as a headed pin 60, which extends through the rod and through the jaw arm, at a point below the spring 54. The jaws 36 and 38 are long enough to put the gripping elements 44 at a sufficient height above the rod 12 so as to grasp the fishing rod handle 20 and to provide adequate clearance space between the rod 12 and reel assembly 22, and its finger grip 62, so as to provide free access thereto. As seen in Figure 1, the heights of the fork 14 and of the clamp 34 are preferably such that the fishing rod 18 is supported on the device 10 directly over and parallel to the rod 12.

The movable jaw 38 of the clamp 34 is opened, relative to the stationary jaw 36, to receive the fishing rod handle 20, by pressing the movable jaw arm toward that of the stationary jaw 36, against the resistance of the spring 54, or by gripping in the hand and squeezing together the arms of the jaws. Release of the jaws, once the handle 20 has been put between the gripping elements 44, frees the spring 54 to close the jaws and firmly grip the handle between the gripping elements. The concave facing sides of the gripping elements embrace opposite sides of the handle 20 and parts of the upper and lower sides thereof, so that the handle 20 is secured clamped in the clamp 34 and the fishing rod 18 is kept from being joggled out of the fork 14.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An oarlock fishing rod holder comprising a rigid rod having an outer end and an inner end, oarlock engaging means on said inner end, an upstanding fishing rod supporting fork on the rod at its outer end, and an upstanding fishing rod embracing clamp mounted on the holder rod at a location near to and spaced outwardly from said inner end, said clamp comprising vertically elongated jaws including a relatively stationary jaw and a movable jaw, means pivoting the jaws together, spring means acting between and closing the jaws, and means pivoting the stationary jaw to the holder rod.

2. An oarlock fishing rod holder comprising a rigid rod having an outer end and an inner end, a depending oarlock bore engaging pintle on the rod at its inner end, an upstanding fishing rod supporting fork on the rod at its outer end, and an upstanding fishing rod embracing clamp mounted on the holder rod at a location near to and spaced outwardly from said pintle, said clamp comprising a relatively stationary jaw, a movable jaw, means pivoting the jaws together, spring means acting between and closing the jaws, and means pivoting the stationary jaw to the holder rod, said jaws having arms at their lower ends and facing fishing rod handle gripping elements on their upper ends, said pivot means comprising overlapping ears on and extending between the arms of the jaws, a pivot pin extending through the ears.

3. An oarlock fishing rod holder comprising a rigid rod, an upstanding fishing rod supporting fork on said rod at one end thereof, oarlock engaging means on the rod at its other end, and an upstanding spring clamp pivoted on an intermediate part of the rod for clamping a fishing rod handle.

4. An oarlock fishing rod holder comprising an elongated straight rigid rod having forward and rear ends, oarlock mounting means on said rear end, an upstanding fishing rod supporting fork on said rod at its forward end, and an upstanding spring clamp mounted on said rod at a location near to and spaced forwardly from the rear end of the rod, said clamp having jaws working toward each other crosswise of the rod.

References Cited in the file of this patent

UNITED STATES PATENTS

| | | |
|---|---|---|
| 1,534,642 | Hoagland | Apr. 21, 1925 |
| 1,719,695 | Ferguson | July 2, 1929 |
| 2,624,536 | Herzog | Jan. 6, 1953 |
| 2,798,684 | Walden | July 9, 1957 |
| 2,900,152 | Hahn | Aug. 18, 1959 |

FOREIGN PATENTS

| | | |
|---|---|---|
| 14,447 | Great Britain | July 8, 1908 |